(12) United States Patent
Lutz et al.

(10) Patent No.: US 9,040,651 B2
(45) Date of Patent: May 26, 2015

(54) POLY(ARYL ETHER SULFONE) COMPOSITION, AND METHOD OF MAKING

(75) Inventors: Eric Lee Lutz, Mount Vernon, IN (US); William Hoy Heath, Lake Jackson, TX (US); Roy Ray Odle, Mount Vernon, IN (US); Thomas Link Guggenheim, Mount Vernon, IN (US); Juan Justino Rodriguez Ordonez, San Javier (ES); Jose Roman Galdamez Pena, Fuente Alamo (ES)

(73) Assignee: SABIC GLOBAL TECHNOLOGIES B.V. (NL)

( * ) Notice: Subject to any disclaimer, the term of this patent is extended or adjusted under 35 U.S.C. 154(b) by 15 days.

(21) Appl. No.: 13/285,043

(22) Filed: Oct. 31, 2011

(65) Prior Publication Data

US 2013/0109831 A1 May 2, 2013

(51) Int. Cl.
| | |
|---|---|
| C08G 75/00 | (2006.01) |
| C08G 75/23 | (2006.01) |
| C08G 65/40 | (2006.01) |
| C08G 65/00 | (2006.01) |

(52) U.S. Cl.
CPC ............... C08G 75/23 (2013.01); C08G 65/40 (2013.01); C08G 65/4056 (2013.01); C08G 65/00 (2013.01)

(58) Field of Classification Search
CPC ............................. C08G 65/40; C08G 65/4056
USPC ........................................................ 528/174
See application file for complete search history.

(56) References Cited

U.S. PATENT DOCUMENTS

| | | | | |
|---|---|---|---|---|
| 3,795,660 | A | * | 3/1974 | Feasey et al. .................... 28/487 |
| 4,105,636 | A | * | 8/1978 | Taylor ............................ 528/126 |
| 4,156,068 | A | * | 5/1979 | Hartmann ...................... 528/175 |
| 4,186,262 | A | * | 1/1980 | Freeman et al. ............... 528/125 |
| 4,239,678 | A | * | 12/1980 | Williams ....................... 524/159 |
| 4,273,712 | A | | 6/1981 | Williams, III |
| 4,310,654 | A | | 1/1982 | Carnahan, Jr. |
| 4,446,294 | A | * | 5/1984 | Rose et al. ..................... 528/128 |
| 4,460,778 | A | * | 7/1984 | Brunelle ........................ 546/304 |
| 4,533,721 | A | * | 8/1985 | Kurosawa et al. ............. 528/174 |
| 4,562,243 | A | * | 12/1985 | Percec ............................ 528/174 |
| 4,595,760 | A | | 6/1986 | Brunelle |
| 4,701,514 | A | * | 10/1987 | Percec ............................ 528/174 |
| 4,806,601 | A | * | 2/1989 | Percec ............................ 525/391 |
| 4,818,803 | A | * | 4/1989 | Harris ............................ 525/390 |
| 4,957,978 | A | * | 9/1990 | Harris ............................ 525/390 |
| 5,053,477 | A | * | 10/1991 | Kern et al. ..................... 528/125 |
| 5,081,298 | A | | 1/1992 | Brunelle |
| 5,084,530 | A | | 1/1992 | Matzner et al. |
| 5,086,157 | A | * | 2/1992 | Reuter et al. .................. 528/171 |
| 5,116,975 | A | | 5/1992 | Brunelle |
| 5,132,423 | A | | 7/1992 | Brunelle et al. |
| 5,229,482 | A | * | 7/1993 | Brunelle ........................ 528/125 |
| 5,567,800 | A | * | 10/1996 | Hergenrother et al. ....... 528/353 |
| 5,663,275 | A | * | 9/1997 | Schmidhauser ............... 528/125 |
| 5,830,974 | A | * | 11/1998 | Schmidhauser et al. ...... 528/125 |
| 6,197,924 | B1 | | 3/2001 | Takekoshi |
| 6,228,970 | B1 | * | 5/2001 | Savariar ........................ 528/125 |

(Continued)

FOREIGN PATENT DOCUMENTS

| | | |
|---|---|---|
| EP | 0043101 A1 | 1/1982 |
| JP | 05163352 A * | 6/1993 |

(Continued)

OTHER PUBLICATIONS

Machine Translation of JP 05-163352, 2013.*
International Search Report for International Application No. PCT/US2012/062353, International Application Filing Date Oct. 29, 2012, Date of Mailing Mar. 1, 2013, 5 pages.
Written Opinion for International Application No. PCT/US2012/062353, International Application Filing Date: Oct. 29, 2012, Date of Mailing Mar. 1, 2013, 7 pages.

*Primary Examiner* — Liam J Heincer
(74) *Attorney, Agent, or Firm* — Cantor Colburn LLP; Diderico van Eyl

(57) ABSTRACT

A poly(aryl ether sulfone) comprises units of formula (I):

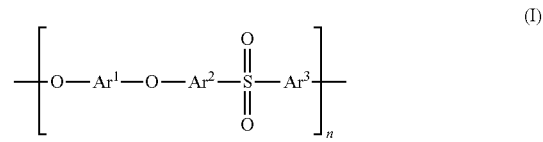

wherein $Ar^1$ is a divalent $C_6$-$C_{15}$ aromatic group, $Ar^2$ is a divalent $C_6$-$C_{15}$ aromatic group, $Ar^3$ is a divalent $C_6$-$C_{15}$ aromatic group, and n is greater than 1;

and a terminal group of formula (II) derived from a monofunctional phenoxide

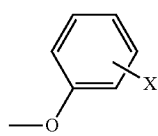

wherein is X is a hydrogen atom or an organic substituent having from 1 to 20 carbon atoms; wherein the poly(aryl ether sulfone) has a hydroxyl group content greater than 0 and less than 50 parts per million (ppm), based on the poly(aryl ether sulfone) weight, a glass transition temperature of 180 to 290° C., a weight average molecular weight of 20,000 to 100,000, a halogen content of greater than 0 and less than 3000 ppm based on the poly(aryl ether sulfone) weight. The poly(aryl ether sulfone) is free of methoxy groups.

8 Claims, 1 Drawing Sheet

(56) References Cited

U.S. PATENT DOCUMENTS

| | | |
|---|---|---|
| 7,125,954 B2 * | 10/2006 | Guggenheim et al. ........ 528/491 |
| 7,273,919 B1 * | 9/2007 | Steiger et al. ................ 528/373 |
| 7,772,435 B2 | 8/2010 | Guggenheim et al. |
| 2002/0049286 A1 * | 4/2002 | Takekoshi .................... 525/437 |
| 2003/0114639 A1 | 6/2003 | Okamoto et al. |
| 2007/0066741 A1 * | 3/2007 | Donovan et al. ............. 524/430 |
| 2010/0204431 A1 * | 8/2010 | Brunelle ...................... 528/170 |
| 2011/0311816 A1 * | 12/2011 | Kanomata et al. ............ 428/402 |
| 2012/0029106 A1 * | 2/2012 | Weber et al. .................. 521/180 |
| 2012/0130041 A1 * | 5/2012 | Han et al. ...................... 528/125 |
| 2012/0149796 A1 * | 6/2012 | Weber et al. .................. 521/180 |

FOREIGN PATENT DOCUMENTS

| | | |
|---|---|---|
| JP | H05163352 | 6/1993 |
| WO | 2008059004 A1 | 5/2008 |
| WO | WO 2009022591 A1 * | 2/2009 |

* cited by examiner

POLY(ARYL ETHER SULFONE) COMPOSITION, AND METHOD OF MAKING

BACKGROUND OF THE INVENTION

This invention relates to a poly(aryl ether sulfone) and a method to synthesize the poly(aryl ether sulfone).

Poly(aryl ether sulfone)s are typically linear, amorphous, injection moldable polymers possessing a number of desirable features such as excellent high temperature resistance, good electrical properties, and toughness. Due to their excellent properties, the poly(aryl ether sulfone)s can be used to manufacture a variety of useful articles such as molded articles, films, sheets, and fibers. Synthesis of poly(aryl ether sulfones) can be difficult—particularly when trying to control molecular weight. Molecular weight control has typically been achieved through the rigorous use of stoichiometric amounts but very small variations in the relative amounts of the monomers can result in significant differences in molecular weight. This makes consistent synthesis in a manufacturing setting difficult. Additionally, the polymer resulting from stoichiometric control can have a less than desirable halogen content, primarily resulting from the dihalodiaryl sulfone monomer. Furthermore, known, ordinary poly(aryl ether sulfones) can contain methoxy groups and are made with reactive alkyl halide-containing materials such as methyl chloride-materials that can raise regulatory and safety concerns.

For the foregoing reasons, there is a need to develop improved, more robust synthetic methods that do not employ reactive alkyl halide-containing materials such as methyl chloride-materials and produce poly(aryl ether sulfones) which are structurally different from poly(aryl ether sulfones) made using reactive alkyl halide-containing materials. Additionally, there is a need to develop a poly(aryl ether sulfone) that can be made without rigorous use of stoichiometric amounts of the monomers needed to make the poly(aryl ether sulfone). Furthermore, there is a need to develop a poly(aryl ether sulfone) having low halogen content.

BRIEF DESCRIPTION OF THE INVENTION

The aforementioned need is addressed, at least in part, by a poly(aryl ether sulfone) comprising units of formula (I):

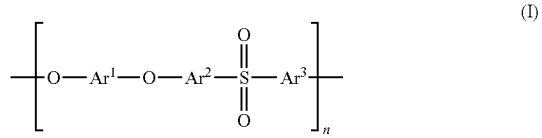

wherein $Ar^1$ is a divalent $C_6$-$C_{15}$ aromatic group, $Ar^2$ is a divalent $C_6$-$C_{15}$ aromatic group, $Ar^3$ is a divalent $C_6$-$C_{15}$ aromatic group and n is greater than 1;

and a terminal group of formula (II) derived from a monofunctional phenoxide

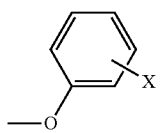

wherein is X is a hydrogen atom or an organic substituent having from 1 to 20 carbon atoms; further wherein the poly(aryl ether sulfone) has a hydroxyl group content greater than or equal to 0 and less than 50 parts per million (ppm), based on the poly(aryl ether sulfone) weight, a glass transition temperature of 180 to 290° C., a weight average molecular weight of 20,000 to 100,000, and a halogen content of greater than 0 and less than 3000 ppm based on the poly(aryl ether sulfone) weight. The poly(aryl ether sulfone) can have a thermal stability factor greater than or equal to 90%. The poly(aryl ether sulfone) can have a yellowness index (YI) less than 120 after an article made from the poly(aryl ether sulfone) is exposed to a temperature of 200° C. in ambient air for 28 days. The poly(aryl ether sulfone) is methoxy free.

Also disclosed herein is a method of making the poly(aryl ether sulfone) comprising reacting a bishydroxy aromatic compound with an aqueous mixture of an alkali metal hydroxide to form a bis salt of the bishydroxy aromatic compound; drying the bis salt of the bishydroxy aromatic compound to form a dry bis salt of the bishydroxy aromatic compound; reacting the dry bis salt of the bishydroxy aromatic compound with a dihalodiaryl sulfone in the presence of an organic solvent, an alkali metal carbonate, and a phase transfer catalyst to form the poly(aryl ether sulfone), wherein a monofunctional phenoxide is added during the method in an amount sufficient to result in a poly(aryl ether sulfone) having a halogen content less than 3000 ppm based on the poly(aryl ether sulfone) weight.

DETAILED DESCRIPTION OF THE INVENTION

Figure 1:
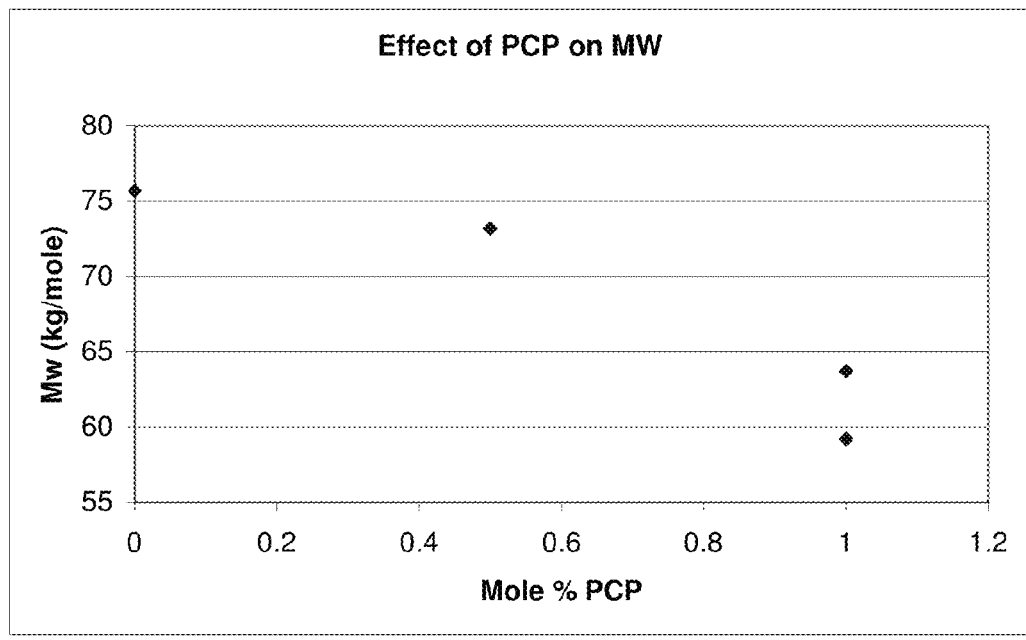
FIGS. 1 and 2 graphically represent data presented in the Examples.

It has been discovered that a monofunctional phenoxide is a highly effective terminating agent in poly(aryl ether sulfone) synthesis. The monofunctional phenoxide has sufficient reactivity to result in approximately 90 to 100% incorporation in the poly(aryl ether sulfone), based on the total moles of monofunctional phenoxide present. Additionally, little or no side products comprising the monofunctional phenoxide are detected. Additionally, the use of the monofunctional phenoxide reduces the halogen content of the poly(aryl ether sulfone). Use of the monofunctional phenoxide relieves the need for tight stoichiometric control of the bis salt of the bishydroxy aromatic compound and the dihalodiaryl sulfone. Also, advantageously, the poly(aryl ether sulfones) do not contain methoxy groups and are not made with reactive alkyl halide-containing materials such as methyl chloride.

In some embodiments the poly(aryl ether sulfone) consists essentially of units of formula (I) and terminal groups of formula (II). "Consists essentially of" as used in this context, describes a polymer having less than 10 weight percent, or, more specifically, less than 5 weight percent, or, even more specifically, less than 3 weight percent, based on the total weight of the polymer, of units and terminal groups other than those described by formulas (I) and (II). In some embodiments the poly(aryl ether sulfone) consists of units of formula (I) and terminal groups of formula (II).

In this specification and in the claims, which follow, reference will be made to a number of terms which shall be defined to have the following meanings. The singular forms "a", "an" and "the" include plural referents unless the context clearly dictates otherwise. "Optional" or "optionally" means that the subsequently described event or circumstance may or may not occur, and that the description includes instances where the event occurs and instances where it does not.

The term "alkyl" as used in the various embodiments of the present invention is intended to designate both linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. The term "alkyl" also encompasses that alkyl portion of alkoxide groups. In various embodiments normal and branched alkyl radicals are those containing from 1 to about 32 carbon atoms, and include as illustrative non-limiting examples $C_1$-$C_{32}$ alkyl optionally substituted with one or more groups selected from $C_1$-$C_{32}$ alkyl, $C_3$-$C_{15}$ cycloalkyl or aryl; and $C_3$-$C_{15}$ cycloalkyl optionally substituted with one or more groups selected from $C_1$-$C_{32}$ alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those substituted or unsubstituted aryl or heteroaryl radicals containing from 6 to 18 ring carbon atoms. Some illustrative non-limiting examples of these aryl radicals include $C_6$-$C_{15}$ aryl optionally substituted with one or more groups selected from $C_1$-$C_{32}$ alkyl, $C_3$-$C_{15}$ cycloalkyl or aryl. Some particular illustrative examples of aryl radicals comprise substituted or unsubstituted phenyl, biphenyl, toluoyl and naphthyl. Heteroaryl groups comprise those containing from about 3 to about 10 ring carbon atoms, and include, but are not limited to, triazinyl, pyrimidinyl, pyridinyl, furanyl, thiazolinyl and quinolinyl. Aryl halides that are very active to reaction are also included. Examples of such materials include 3,4-dinitrochlorobenzene, 3,4-dinitrofluorobenzene, 2-fluoro-benzenesulfonamide, and 4-fluorobenzenesulfonamide.

The term "methoxy free" means that the polymer, at least, has structural units of Formula (I) that do not contain methoxy terminal groups and preferably that the entire polymer does not contain any methoxy groups (structural units of formula (I) and the polymer's backbone do not have any methoxy groups).

As discussed above the poly(aryl ether sulfone) comprises structural units of formula (I) and a terminal group of formula (II). Structural groups of formula (I) are derived from a bishydroxy aromatic compound and a dihalodiaryl sulfone. Exemplary bishydroxy aromatic compounds are HO—$Ar^1$—OH wherein $Ar^1$ is defined as mentioned above. Exemplary bishydroxy compounds are represented by the formula (III):

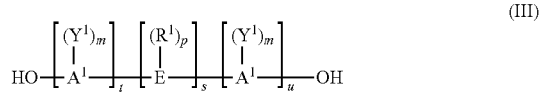

(III)

wherein $A^1$ represents an aromatic group including, but not limited to, phenylene, biphenylene, naphthylene, and the like. In some embodiments E may be an alkylene or alkylidene group having up to 3 carbons including, methylene, ethylene, ethylidene, propylene, propylidene, and isopropylidene. Additionally, E can be sulfur, SO, $SO^2$, or oxygen. $Y^1$ independently at each occurrence may be an inorganic atom including, but not limited to, halogen (fluorine, bromine, chlorine, iodine); an inorganic group containing more than one inorganic atom including, but not limited to, nitro; an organic group including, but not limited to, a monovalent hydrocarbon group including, but not limited to, alkenyl, allyl, alkyl, aryl, aralkyl, alkaryl, or cycloalkyl, or an oxy group including, but not limited to, $OR^2$ wherein $R^2$ is a monovalent hydrocarbon group including, but not limited to, alkyl, aryl, aralkyl, alkaryl, or cycloalkyl with the proviso that the oxy group is not a methoxy group; it being only necessary that $Y^1$ be inert to and unaffected by the reactants and reaction conditions used to prepare the polymer. In some particular embodiments $Y^1$ comprises a halo group or $C_1$-$C_3$ alkyl group. The letter "m" represents any integer from and including zero through the number of replaceable hydrogens on $A^1$ available for substitution; and the parameter "t" represents an integer greater than or equal to one. The parameters "s" and "u" can be zero or an integer greater than or equal to 1. When "s" is zero and "u" is one then a single bond connects the two $A^1$ groups. The definitions of the chemical variable in formula (III) are chosen so as to be consistent with the definition of $Ar^1$ in formula (I). The poly(aryl ether sulfone) can be a homopolymer or a copolymer.

In bishydroxy aromatic monomers of formula (III) above, when more than one $Y^1$ substituent is present, they may be the same or different. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the aromatic residue are substituted with $Y^1$ and hydroxyl groups. Exemplary monomers include 4,4'-bisphenol, bisphenol A and combinations thereof.

As mentioned above structural units of formula (I) are derived from a bishydroxy aromatic compound and a dihalodiaryl sulfone. Exemplary dihalodiaryl sulfones are X—$Ar^2$—$SO_2$—$Ar^3$—X wherein $Ar^2$ and $Ar^3$ are defined as mentioned above and X is a halogen. A wide variety of dihalodiarylsulfone monomers may be used to prepare the poly(aryl ether sulfone). Typically, sulfone-containing structural units are derived from a dihalodiarylsulfone monomer which bears halogen substituents reactive towards displacement by phenoxide moieties (e.g. the phenoxide moieties present in the disodium salt of the bishydroxy aromatic compound). In some embodiments dihalodiarylsulfone comprises at least one of a dichloro- or a difluorodiaryl sulfone. In some embodiments the dihalodiarylsulfone comprises a dihalodiphenylsulfone. In some embodiments the dihalodiarylsulfone comprises a 4,4'-dihalodiarylsulfone, Illustrative examples of 4,4'-dihalodiarylsulfones include 4,4'-dichlorodiphenylsulfone, 4,4'-difluorodiphenylsulfone, 4,4'-bis(4-chlorophenyl sulfonyl)biphenyl and 4,4'-bis(4-fluorophenyl sulfonyl)biphenyl. Without being bound by theory it is believed that the halogen found in the poly(aryl ether sulfone) originates in the dihalodiaryl sulfone.

The terminal group of formula (II) is derived from a monofunctional phenol. The term "monofunctional phenol" is defined herein as a phenyl group with a single hydroxyl group. The phenyl group may be further substituted with an organic substituent having 1 to 20 carbon atoms. Exemplary monofunctional phenols include phenol, p-t-butyl-phenol, m-t-butyl-phenol, 4-hydroxybenzamide, 4-phenoxyphenol, 4-hydroxy-N,N-dimethylbenzamide, 4-ethynylphenol, 4-tert-butyl-2-methylphenol, 4-(2-phenylpropan-2-yl)phenol, (4-hydroxyphenyl)(phenyl)methanone, methyl 4-hydroxybenzoate, 4-(2,4-dimethylheptan-3-yl)phenol, para cumyl phenol, 4-phenyl phenol, para methyl phenol, para nonylphenols, o-t-butyl phenol, hydroxy benzoic acid esters, and combinations thereof. In some embodiments the monofunctional phenol is selected from the group consisting of phenol, para cumyl phenol, 4-phenyl phenol, and combinations thereof.

The terminal group of formula (II) can be present in an amount of 1 mol % to 10 mol %, based on the total number of moles of sulfone groups present in the polymer.

The poly(aryl ether sulfone) is made in a reaction mixture comprising alkali metal salt of a bishydroxy aromatic compound (the bis salt of the bishydroxy compound), alkali metal salt of the monofunctional phenol (the monofunctional phenoxide), and a dihalodiarylsulfone monomer, an organic solvent and at least one phase transfer catalyst (hereinafter sometimes "PTC"). The alkali metal salt of the bishydroxy aromatic compound is typically a sodium or potassium salt. Sodium salts are often used by reason of their availability and relatively low cost. In one embodiment, the salts are formed by contacting a bishydroxy aromatic compound with an alkali metal carbonate. In another embodiment, the salts are formed by contacting bishydroxy aromatic compounds with an alkali metal hydroxide.

The organic solvent has low polarity. The solvent can have a boiling point above about 150° C. in order to facilitate the polymerization reaction, which typically requires temperatures of about 125° C. to about 250° C. Suitable solvents of this type include, but are not limited to, ortho-dichlorobenzene, para-dichlorobenzene, dichlorotoluene, 1,2,4-trichlorobenzene, diphenyl sulfone, phenetole, anisole and veratrole, and mixtures thereof. In some embodiments the organic solvent forms an azeotrope with water. In some embodiments the organic solvent is ortho-dichlorobenzene.

The alkali metal carbonate can be present in an amount of greater than 0 to 10 weight percent, based on the total weight of the reaction mixture. In another embodiment, the alkali metal carbonate is present in an amount greater than 0 to 1, 2, 3, 4, 5, 6, 7, and 9 weight %. In another embodiment, the alkali metal carbonate is used in an amount greater than 0 to 1.5 weight percent. In some embodiments the alkali metal carbonate is potassium carbonate.

Suitable phase transfer catalysts include those that are substantially stable at temperatures required to effect reaction to make the poly(aryl ether sulfone)s. Substantially stable in the present context means that the PTC is sufficiently stable at the temperatures needed to effect the desired polymerization reaction at a synthetically useful reaction rate. Different types of phase transfer catalysts may be employed. They include quaternary phosphonium salts of the type disclosed in U.S. Pat. No. 4,273,712; N-alkyl-4-dialkylaminopyridinium salts of the type disclosed in U.S. Pat. Nos. 4,460,778 and 4,595,760; and guanidinium salts of the type disclosed in U.S. Pat. Nos. 5,081,298, 5,116,975 and 5,132,423. Exemplary phase transfer catalysts, by reason of their exceptional stability at high temperatures and their effectiveness to produce high molecular weight aromatic polyether polymers in high yield, comprise alpha-omega-bis(pentaalkylguanidinium)alkane salts and hexaalkylguanidinium salts. Hexaalkylguanidinium salts include, but are not limited to, hexaalkylguanidinium halides and especially hexaalkylguanidinium chlorides. Methods for employing guanidinium salts as catalysts are disclosed, for example, in U.S. Pat. No. 5,229,482. In a particular embodiment a catalyst comprising hexaethylguanidinium chloride is employed.

The catalyst can be present in an amount of about 0.5 mole percent to about 10 mole percent based on the total amount of alkali metal salt. The total amount of alkali metal salt is defined herein as the total amount of the salts of the bishydroxy aromatic compounds employed. Within this range the catalyst can be present in an amount of about 1 mole percent to about 4 mole percent, or, more specifically, about 2 mole percent to about 4 mole percent.

The molar amount of the dihalodiarylsulfone is generally at least equivalent to and preferably in excess of the combined molar amounts of the bis salt of the bishydroxy compound and the monofunctional phenoxide. More particularly, the dihalodiarylsulfone:total bis salt and monofunctional phenoxide molar ratio is generally 1:0.96 to 1:1. In practice, it is understood that calculated excesses may be subject to some variability due to separation (fractionation) of the solvent from the suspension of the bisphenolate, as may be evidenced by comparing the polymer's actual degree of polymerization that is obtained versus the degree of polymerization that is predicted by the formula:

$$DP=1+R/(1-R), \text{ where } R=N_{AA}/(N_{BB}+2N_E)$$

where R is the molar ratio of the phenoxide to chloride monomers used to make the polymer (without a chain stopper), DP is the degree of polymerization, $N_{AA}$ is the number of moles of dihalodiarylsulfone monomer, $N_{BB}$ is the number of moles of the bis salt of the bishydroxy aromatic compound, and $N_B$ is the number of moles of the monofunctional phenoxide.

The polymerization reaction temperature can be about 125° C. to about 250° C. Within this range the temperature can be greater than or equal to 170° C. Also within this range the temperature can be less than or equal to 185° C.

In one embodiment, the reagents employed: the phase transfer catalyst, the alkali metal salt of the bishydroxy aromatic compound, the dihalodiarylsulfone, monofunctional phenoxide, and the solvent, are substantially dry. In the present context "substantially dry" means that the reaction mixture comprising the said reactants contains at most about 100 ppm by weight of water. In some particular embodiments the amount of water in the reaction mixture is less than about 50 ppm, and in still other embodiments less than about 20 ppm. The proportion of water may be determined by any convenient means and is typically determined by Karl Fischer coulometric titration. In some embodiments the amount of water in the reaction mixture is determined indirectly by measuring water content of an over-head distillate or condensate. Dry catalyst may be employed which means that the catalyst contains less than about 100 ppm water, or, more specifically, less than about 50 ppm water, or, even more specifically, less than about 30 ppm water.

Accordingly, the method for preparing the poly(aryl ether sulfone) can comprise reacting a bis hydroxyl aromatic compound with an aqueous mixture of an alkali metal hydroxide, thereby forming a bis salt of the bishydroxy aromatic compound. The bis salt is then dried to form a substantially dry bis salt (i.e, having a water content less than or equal to 100 ppm, or, more specifically, less than or equal to 50 ppm, based on the total weight of the bis salt). The bis salt is then reacted with a dihalodiaryl sulfone in the presence of an organic solvent and a phase transfer catalyst. Monofunctional phenoxide is added to the reaction in an amount sufficient to result in a poly(aryl ether sulfone) having a halogen content less than or equal to 3000 ppm, based on the total weight of the poly(aryl ether sulfone). In some embodiments, a monofunctional phenol or monofunctional phenoxide is added to the reaction of the bishydroxy aryl compound and the alkali metal hydroxide. In some embodiments the monofunctional phenoxide is added after formation of the poly(aryl ether sulfone).

The reaction mixture has a solids content of greater than 0 to less than 30 weight percent, based on the weight of the poly(aryl ether sulfone), after the poly(aryl ether sulfone) has formed. The solids content can be greater than 0 and less than or equal to 25 weight percent. In one embodiment the solids content is 20 to 25 weight percent. In another embodiment, the solids content ranges from greater than 0 to an upper range selected from the group of 1, 2, 3, 4, 5, 6, 7, 8, 9, 10, 11, 12, 13, 14, 15, 16, 17, 18, 19, 20, 21, 22, 23, 24, and 25 weight percent.

Following the achievement of a desired molecular weight the polymerization reaction may be quenched by addition of a quenching agent. Suitable quenching agents typically comprise at least one acidic compound, said acidic compound being in solid, liquid, gaseous, or solution form. Suitable acids include organic acids, particularly carboxylic acids such as acetic acid, malic acid, oxalic acid, and the like. Suitable acids also include inorganic acids such as phosphorous acid, phosphoric acid, polyphosphoric acid, hypophosphorous acid, sulfuric acid, hydrochloric acid, anhydrous hydrochloric acid, and the like. A gaseous acid, such as anhydrous hydrochloric acid, can be bubbled into the mixture through a sparger or delivered as a solution in a convenient solvent such as the same organic solvent as used in polymerization reaction. Mixtures comprising at least two acids may also be employed.

The amount of quenching agent used is an amount sufficient to end the polymerization reaction. In particular embodiments the amount of acid quenching agent used is at least sufficient to react with the calculated amount of phenoxide end-groups that will be present for a given molecular weight of poly(aryl ether sulfone) product. "Phenoxide end groups" as used herein refers to the end groups that result from the bis salt of the bishydroxy aromatic compound; this term does not refer to the end groups which result from the monofunctional phenoxide. Preferably the quantity of acid added is greater than the calculated amount and more preferably about twice the calculated amount of phenoxide end-groups that will be present for a given molecular weight of poly(aryl ether sulfone) product. The acid may be added using any convenient protocol. In some embodiments the amount of acid added is in a range of between about 0.02 to about 0.21 millimoles (mmol) acid per gram of polymer or between about 0.07 to about 0.21 mmol acid per gram of polymer.

The poly(aryl ether sulfone)s may be isolated by conventional methods. These include, but are not limited to, one or more steps of salt agglomeration, filtration, washing with water, solvent removal, precipitation, drying and the like. In some embodiments a reaction mixture comprising poly(aryl ether sulfone) is combined with a non-solvent for the poly (aryl ether sulfone) to effect precipitation of the polymer. In another embodiment the polymer can be isolated by steps which comprise total devolatilization, for example in a devolatilizing extruder.

The poly(aryl ether sulfone) has a hydroxyl group (OH) content of greater than or equal to 0 and less than or equal to 50 ppm, based on the weight of the poly(aryl ether sulfone). Within this range the hydroxyl group content can be less than or equal to 30 ppm, or, more specifically, less than or equal to 20 ppm, which is the current limit of detection. The poly(aryl ether sulfone) can have an OH content ranging from more than 0 to a member selected from the group of 1, 2, 3, 4, 5 6, 7, 8, 9, 10, 11, 12, 13, 14, 15, 16, 17, 18, 19, 20, 21, 22, 23, 24, 25, 26, 27, 28, 29, 30, 31, 32, 33, 34 35, 36, 37, 38, 39, 40, 41, 42, 43, 44, 45, 46, 47, 48, 49, and less than or equal to 50 ppm.

The poly(aryl ether sulfone) has a glass transition temperature (Tg) of 180 to 290° C. Within this range the glass transition temperature can be 215 to 285° C., specifically, 220 to 225° C., more specifically 220 to an upper range selected from the group of 221, 222, 223, 224, and 225. The glass transition temperature is determined by differential scanning calorimetry (DSC).

As noted, the poly(aryl ether sulfone) has a weight average molecular weights (Mw) of at least 20,000 to 100,000 grams per mole. Within this range the weight average molecular weight can be greater than or equal to 40,000. Also within this range the weight average molecular weight can be less than or equal to 60,000. Weight average molecular weights ($M_w$) are measured by gel permeation chromatography (GPC) versus polystyrene standards and are expressed in grams per mole.

The poly(aryl ether sulfone) has a halogen content greater than 0 and less than or equal to 3000 ppm, based on poly(aryl ether sulfone) weight. Within this range the halogen content can be greater than or equal to 900, or, greater than or equal to 1500. Also within this range the halogen content can be less than or equal to 2500, or, less than or equal to 1500, or, less than or equal to 900, or, less than or equal to 500 ppm. In other embodiments, the halogen content can be greater than 0 and less than 400 ppm, more than 0 and less than 300 ppm, more than 0 and less than 200 ppm, more than 0 and less than 100 ppm, and more than 0 and less than 50 ppm. The halogen is selected from the group consisting of chlorine, bromine, iodine, fluorine and combinations thereof. In some embodiments the halogen is chlorine.

The poly(aryl ether sulfone) can have a thermal stability factor that is greater than or equal to 90%, or, greater than or equal to 95%. Thermal stability factor is defined as the retention of molecular weight, in percentage terms, after exposure to air at 200° C. for 28 days. Thus if an amorphous polymer retains 90% of its original molecular weight after being exposed to air at 200° C. for 28 days then the polymer has a thermal stability factor of 90%.

Articles made from the poly(aryl ether sulfone) can have a yellowness index (YI) of less than 120 after being exposed to air at a temperature of 200° C. for 28 days.

The poly(aryl ether sulfone) described herein is an amorphous thermoplastic. The term "amorphous," when used to define the poly(aryl ether sulfone) means that the poly(aryl ether sulfone) does not exhibit a crystalline melting peak when the poly(aryl ether sulfone) is subjected to a Differential Scanning calorimeter (DSC) at 20° C./minute ramp rate.

The terminal groups of formula (II) are present in an amount of 1 to 10 mol %, based on the total moles of sulfone ($SO_2$) groups in the poly(aryl ether sulfone). Within this range the amount of terminal groups can be greater than or equal to 1 and less than or equal to 2, 3, 4, or 5.

As such, it can be useful and convenient to employ an additional chain termination agent, to limit the molecular weight of the product poly(aryl ether sulfone). Thus, reaction mixtures used in the preparation of poly(aryl ether sulfone)s may optionally comprise at least one chain termination agent in addition to the monofunctional phenoxide of formula (II). Suitable chain termination agents include, but are not limited to, all those comprising a single activated substituent capable of being displaced by a phenoxide moiety derived from the bis salt of the bishydroxy aromatic compound during the polymerization process thereby end-capping the polymer chain. In various embodiments suitable chain termination agents include, but are not limited to, alkyl halides such as alkyl chlorides, and aryl halides including, but not limited to, chlorides of formulas (VIII):

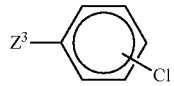

(VIII)

wherein the chlorine substituent is in the 3- or 4-position, and $Z^3$ is a substituted or unsubstituted alkyl or aryl group. Suitable chain termination agents encompassed by generic formula (VIII) include 2-chlorobenzophenone, 4-chlorobenzophenone, 2-chlorophenyl phenyl sulfone, 4-chlorophenyl phenyl sulfone (CAS Registry No. 80-00-2) and the like.

Other suitable chain-termination agents comprise activated phthalimides, illustrative examples of which include, but are not limited to, chloro-N-arylphthalimides, chloro-N-alkylphthalimides, 3-chloro-N-phenylphthalimide, 4-chloro-N-phenylphthalimide, 3-chloro-N-methylphthalimide and 4-chloro-N-methylphthalimide. Mixtures comprising two or more chain termination agents can also be used.

Advantageously, the method and composition described herein provides previously unavailable benefits. The poly(aryl ether sulfone) is not made with reactive alkyl halide-containing materials such as methyl chloride-materials. The poly(aryl ether sulfone) described herein are structurally different from known poly(aryl ether sulfones). The poly(aryl ether sulfone) described herein can be made without rigorous use of stoichiometric amounts of the monomers needed to make the poly(aryl ether sulfone). The poly(aryl ether sulfone) has low halogen content. The poly(aryl ether sulfone) exhibits a combination of properties that are useful and beneficial.

The composition and method are further illustrated by the following non-limiting examples.

EXAMPLES

The purpose of these examples was to evaluate the use of a monofunctional phenoxide as a terminating agent and how the use of monofunctional phenoxide affects the halogen content, e.g., chlorine content, color thermal stability, haze, molecular weight, and molecular weight retention of poly(aryl ether sulfones). The examples used the materials shown in Table 1.

TABLE 1

| Material | Description | Source |
| --- | --- | --- |
| p-Cumyl phenol sodium salt | Suspended alkali salt in o-dichlorobenzene | Para-cumyl phenol was manufactured by SABIC-IP and converted to the sodium salt using the method described below |
| 4,4'-biphenol disodium salt | Dialkali salt suspended in o-dichlorobenzene | 4,4'-biphenol was manufactured by Melog and converted to the disodium salt using the method described below |
| Bisphenol-A disodium salt | Dialkali salt suspended in o-dichlorobenzene | 4,4'-bisphenol A was manufactured by Hexion and converted to the disodium salt using the method described below |
| 4,4'-dichlorodiphenylsulfone | Solid, used as received | Ganesh Polychem |
| o-dichlorobenzene (ODCB) | Liquid, contained less than 20 ppm $H_2O$ | Fisher Scientific |
| Hexaethylguanidinium chloride | Solution in o-dichlorobenzene | Made as described below |
| Potassium carbonate | Oven dried solid used as received. | Armand |
| BASF P3010 | PPSU pellets, used as received | BASF |
| BASF 94956367J0 | PPSU pellets, used as received | BASF |
| BASF 86663867J0 | PPSU pellets, used as received | BASF |
| BASF Ultrason E 2010 | PES, used as received | BASF |
| Solvay Udel | PSU pellets, used as received | Solvay |
| Solvay M10297T | PPSU pellets, used as received | Solvay |
| Solvay M10082J | PPSU pellets, used as received | Solvay |
| Solvay Oct. 27, 2007 | PPSU pellets, used as received | Solvay |
| Solvay R5100NT AM667 | PPSU pellets, used as received | Solvay |
| Solvay R5800 | PPSU pellets, used as received | Solvay |
| Solvay R5000 old | PPSU pellets, used as received | Solvay |
| Solvay R5500 Black | PPSU pellets, used as received | Solvay |
| Solvay M07187T | PPSU pellets, used as received | Solvay |
| Jida PPSU | PPSU pellets, used as received | Jida/Degussa |
| U2 SLT 77-79 | Polyetherimide pellets, used as received | SABIC |

Techniques and Procedures

Preparation of hexaethylguanidinium chloride in o-dichlorobenzene: Prepared in a manner according to U.S. Pat. No. 7,772,435.

Preparation of 4,4'-biphenol disodium salt: A 2 liter three-neck round-bottomed flask was equipped with two thermometer adapters modified with a rubber septum—one of which was penetrated by a stainless steel needle supplying nitrogen and another sealing a glass siphon tube connected to a peristaltic pump by Masterflex Chem-Durance® tubing. The third neck was fitted with a water-cooled condenser sealed by oil bubbler. The flask contained a magnetic stirrer. 1550 milliliters of Fisher Optima® methanol was added and degassed with nitrogen by submerged needle for 30 minutes. Biphenol (93.0991 g, 0.5 mol) was charged to the flask with a slight nitrogen purge and the mixture was allowed to degas for an additional 10 minutes. A 1N sodium hydroxide Acculute (1 mol) was added to the mixture through a neck with sufficient nitrogen purge to prevent entry of oxygen and was stirred at room temperature for 30 minutes. An exotherm was observed. Separately, 500 milliliters of o-dichlorobenzene was added to a 1 liter three-necked round-bottomed flask equipped with a Dean-Stark trap (wrapped with heat tape) with graham condenser attached and connected to an oil bubbler at the top of the condenser, Teflon stopper equipped to the middle neck, magnetic stirrer, and a modified thermometer adapter supplying nitrogen was added to the third neck. A needle with nitrogen supply degassed the o-dichlorobenzene and flask for 30 minutes prior to being heated to 150° C. The methanolic solution was dripped into the o-dichlorobenzene at a rate of about 1 drop/second with a peristaltic pump (approximately 3 to 5 milliliters/minute). The disodium salt precipitated upon addition to the hot o-dichlorobenzene and the added methanol and water was removed via distillation. Upon completion 250 milliliters of additional degassed ODCB was added to the salt suspension and was dried by azeotropic distillation at reflux until the distillate contained less than 20 ppm water. Typically, salt suspensions were allowed to cool overnight while stirring which helped to decrease the particle size of the biphenol disodium salt.

The salt suspension was transferred to a dry box maintained under a nitrogen atmosphere where it was poured into a 1 liter glass jar, homogenized by a hand held homogenizer and was left stirring under nitrogen by magnetic stir bar.

Preparation of p-cumyl phenol sodium salt: same as described for biphenol salt preparation but with use of p-cumyl phenol and 1 equivalent of NaOH per mol of p-cumyl phenol.

Preparation of bisphenol-A disodium salt: same as described for biphenol salt preparation but with use of bisphenol-A and 2 equivalents of NaOH per mol of bisphenol-A.

Potentiometric titration of phenolic salts: Phenolate percent solids were measured by potentiometric titration with a Mettler-Toledo DL70 equipped with an auto sampler. Samples were titrated with 0.1N or 1.0N HCl standardized with tris(hydroxymethyl)aminomethane (THAM). 0.5 gram-1 gram of stirred salt suspension was added to a cup and dissolved in 40 milliliters of a 50/50 (v/v) mix of methanol/water diluent. HCl was titrated past the endpoint, and the 1$^{st}$ derivative curve was used to identify exact endpoint for % solids determination. Procedure was repeated three times and then the results were averaged.

Laboratory polymerizations were performed by the following procedure. In a nitrogen atmosphere, a 3-neck 250 milliliter flask was charged with solid 4,4'-dichlorodiphenyl sulfone, 5 wt % suspension of p-cumyl phenol sodium salt in o-dichlorobenzene, suspension of bisphenol-A disodium salt in o-dichlorobenzene, suspension of 4,4'-biphenol disodium salt in o-dichlorobenzene, solid $K_2CO_3$ and dry o-dichlorobenzene. All suspensions were individually measured for phenoxide content by potentiometric titration with 0.1N HCl in 50% (v/v) MeOH/$H_2O$. Additionally attached to the flask were a modified thermometer adapter with septa, a glass rod with Teflon blade, and a Dean Stark trap with Teflon stopper. Nitrogen was supplied to the flask by a stainless steel needle through the septum and the stopper replaced by a water-cooled condenser when placed in a fume hood. Heat was supplied by a temperature controlled oil bath at 200° C. and the contents were azeotropically dried by removal of o-dichlorobenzene until collected overheads were below 20 ppm $H_2O$ by Karl Fischer titration and the desired reaction solids, typically 25-28% polymer, were reached. A 20 wt % solution of catalyst (hexaethylguanadinium chloride) in o-dichlorobenzene, typically 4 mol % with respect to dichlorodiphenyl sulfone, was slowly added to the flask by syringe through the septum. Additional catalyst was added if the reaction did not initiate. Upon reaction initiation, an exotherm and a color change were observed and molecular weight built immediately. Molecular weight was monitored by gel permeation chromatography and adjustments were made with suspended bisphenol-A salt in o-dichlorobenzene (in the amounts shown in Table 6) until target molecular weight was achieved.

After reaching molecular weight target, the polymer was quenched with an excess of 85% $H_3PO_4$ at 160° C. and diluted to 10% solids with regard to the polymer with o-dichlorobenzene. The reaction mixture was cooled and mixed with 100 milliliters of dichloromethane, washed twice with an equal volume of deionized water to volume of solvent, and the organic phase was then precipitated into an equal volume of hexanes and placed in a vacuum oven at 130° C. at full vacuum for 24 hours.

Halogen Detection Techniques: to determine the amount of chlorine present in the polymer, the following techniques were used.

Analysis 1: Lab samples and commercial samples were used as received.

Analysis 2: A 10 wt % solution of polymer was made in veratrole (o-dimethoxybenzene) and heated to 170° C. for complete dissolution of the polymer. Sample was allowed to completely cool before the polymer solution was precipitated in a Waring 1 liter blender containing 300 milliliters of methanol. The polymer was isolated by vacuum filtration and allowed to air dry before being placed in a vacuum oven at full vacuum at 150° C. overnight.

The chlorine (halogen) content of the polymer was determined by measuring the total chlorine content of the sample and the extractable chlorine content of the sample. The difference between the total chlorine content and the extractable chlorine content is defined as the polymer chlorine content.

Total chlorine content was measured using a Parr bomb. 0.2-0.4 grams of sample was placed into a combustion cup. Powder samples were pressed into a pellet. 10 milliliters of deionized water was added to the bottom of the Parr Bomb. Ignition wires were placed in the Parr Bomb head so that the wire ends were 5 to 7 millimeters above the combustion cup. 400 microliters of butanol was added to the combustion cup. The Parr bomb was purged with oxygen for 15 to 30 seconds at 5 atmospheres of pressure and was slowly pressurized to approximately 30 atmospheres of oxygen. The Parr bomb was placed in a water bath and ignited for approximately 5 seconds. The apparatus was allowed to cool for 20 to 30 minutes removed from bath, and dried. 10 milliliters of deionized (DI) water was added through a relief valve. The contents were transferred into a 50 milliliter volumetric. The bomb and bomb head were rinsed with DI water and poured into the volumetric. The volumetric was then filled to the line with DI water as needed. A blank was combusted and analyzed for each set of samples analyzed and was performed as written above without the addition of polymer to the system.

Extractable chlorine was determined by the following method. 2.5 (±0.5) grams of sample was weighed into a 2 ounce glass sample bottle. The sample weight was recorded on the bottle. 20 milliliters of methylene chloride or appropriate organic solvent was added. The sample was shaken until dissolved, but not less than 30 minutes. 15 milliliters of DI water was added and shaken for a minimum of 30 minutes to extract the ions from the sample. The sample was allowed to separate. If the aqueous layer was not clear then the sample was centrifuged for approximately 5 minutes. The aqueous layer was transferred into an ion chromatography (IC) vial. The sample was filtered if necessary using a 0.2 micrometer disposable syringe filter. A blank was prepared using all the preceding steps except for adding the sample to the sample bottle.

The instrumental setup is shown below:
Instrument: Dionex ICS-2000 Ion Chromatography
Column:
AS11 Analytical column
AG11-HC Guard column
CR-A Trap column
ASRS 300 4 mm Suppressor
Column Temp: 35° C.
Detector: DS6 heated Conductivity detector
Suppressor current: 150 milliAmperes
Injection volume: 100 microliters
Gradient:
0-9 minutes; ramps from 2.5 mM KOH to 4.0 mM KOH
9-13 minutes; ramps from 4.0 mM KOH to 25.0 mM KOH
13-27 minutes.; 5.0 mM KOH
Flow rate: 1.5 milliliters/minute
Runtime: 27 minutes
Software: Chromeleon data software Molecular Weight Measurement Technique: 500 milligrams of polymer was weighed in a 4 dram vial and 10 milliliters of 10% hexafluoro 2-propanol in methylene chloride (v/v) was added by glass pipette and shaken until the polymer dissolved. Molecular weights were determined by GPC analysis with a Waters 2695 Separations Module equipped with a Polymer Labs Plgel 5 micrometer MIXED-C column and Waters 2487 PDA detector at 254 nm Elution was effected with an isocratic solvent system of dichloromethane at 1 milliliter/minute and Mw was reported relative to polystyrene standards obtained from Polymer Labs. Each sample was run for 15 minutes with an injection volume of 5 microliters.

Hydroxyl terminal group (also referred to as "end group") determination: 225 milligrams of polymer was combined with 4 milliliters of 0.5M chromium acetylacetonate in chloroform having a known concentration of internal standard. The sample was shaken to dissolve the polymer. Once dissolved, the solution was treated with an excess of 1,2-phenylene phosphorochlorodite and transferred immediately to a 5 or 10 millimeter NMR tube and P31NMR shifts are recorded with f=>300 MHz, pulse width or 35°, 32 k or 64 k data points, 1.8 sec delay and 1600-2500 scans.

The ppm of hydroxyl end groups was calculated by:

$$\frac{\text{Weight of Standard}}{\text{Molecular weight of Standard}} \times \frac{\text{Integral} - OH}{\text{Integral standard}} \times 17 \times \frac{1}{\text{weight of polymer taken}} \times \frac{4 \text{ ml}}{100 \text{ ml}} \times 10^6$$

Methoxy end group determination: 30-50 milligrams of polymer was added to approximately 1.2 milliliters of deuterated chloroform or a 10:1 solution of deuterated chloroform to deuterated hexafluoroisopropanol, and shaken to dissolve the polymer. The polymer solution was transferred to a 5 millimeter NMR tube and measured with a frequency greater than 400 MHz, pulse width of 90°, spectral window 15 to −5 ppm, Acquisition time of 2.7 seconds, recycle delay of 20 seconds and a total of 16 scans.

Integrals are obtained from aromatic proton shift region (baseline of 7.59 doublet or 7.90 doublet) and methyl ether shift region of 3.8-3.85 singlet.

Where ppm of —OMe is approximated by:

$$\frac{\left(\frac{\text{Integral of methyl}}{3} \times 31.0339\right)}{\left(\frac{\text{Integral of biphenyl}}{8} \times 400.4464\right)} \times 1000000$$

TABLE 2

| | | 0.5 mol % PCP | | | |
|---|---|---|---|---|---|
| | | Charge (g) | % Solids | Mass (g) | mol | eq |
| Example 1 | DCDPS | 28.00 | | 28.00 | 0.09751 | 1.0000 |
| | BP Salt | 88.35 | 19.862 | 17.548077 | 0.07624 | 0.7819 |
| | BPA Salt | 27.85 | 18.629 | 5.1881765 | 0.01906 | 0.1954 |
| | PCP Salt | 2.28 | 5 | 0.114 | 0.00049 | 0.0050 |
| | K2CO3 | 2 | | 2 | 0.01447 | 0.1484 |
| | HEGCl | 5.16 | 20 | 1.032 | 0.00391 | 0.0401 |
| | ODCB | 99.758 | | | | |

TABLE 3

| | | 1 mol % PCP | | | | |
|---|---|---|---|---|---|---|
| | BH89 | Charge (g) | % Solids | Mass (g) | mol | eq |
| Example 2 | DCDPS | 14 | | 14 | 0.04875 | 1.0000 |
| | BP Salt | 44.154 | 19.862 | 8.76986748 | 0.03810 | 0.7815 |
| | BPA Salt | 13.87 | 18.51 | 2.567337 | 0.00943 | 0.1934 |
| | PCP Salt | 2.28 | 5 | 0.114 | 0.00049 | 0.0100 |
| | K2CO3 | 2 | | 2 | 0.01447 | 0.2968 |
| | HEGCl | 2.57 | 20 | 0.514 | 0.00195 | 0.0400 |
| | ODCB | 50.909 | | | | |

TABLE 4

| | | 2 mol % PCP | | | | |
|---|---|---|---|---|---|---|
| | EL10 | Charge (g) | % Solids | Mass (g) | mol | eq |
| Example 3 | DCDPS | 14.0048 | | 14.0048 | 0.04877 | 1.0000 |
| | BP Salt | 43.88 | 19.862 | 8.7154456 | 0.03787 | 0.7764 |
| | BPA Salt | 13.8 | 18.51 | 2.55438 | 0.00938 | 0.1924 |
| | PCP Salt | 4.58 | 5 | 0.229 | 0.00098 | 0.0200 |
| | K2CO3 | 2.04 | | 2 | 0.01447 | 0.2967 |
| | HEGCl | 4.5352 | 20 | 0.90704 | 0.00344 | 0.0705 |
| | ODCB | 54.389 | | | | |

TABLE 5

| | | 4 mol % PCP | | | | |
|---|---|---|---|---|---|---|
| | EL09 | Charge (g) | % Solids | Mass (g) | mol | eq |
| Example 4 | DCDPS | 14.0275 | | 14.0275 | 0.04885 | 1.0000 |
| | BP Salt | 43.68 | 19.862 | 8.6757216 | 0.03769 | 0.7716 |
| | BPA Salt | 13.74 | 18.51 | 2.543274 | 0.00934 | 0.1912 |
| | PCP Salt | 9.19 | 5 | 0.4595 | 0.00196 | 0.0401 |
| | K2CO3 | 2.1 | | 2.1 | 0.01447 | 0.2962 |
| | HEGCl | 6.2996 | 20 | 1.25992 | 0.00478 | 0.0978 |
| | ODCB | 59.971 | | | | |

TABLE 6

| | BPA Salt Add (g) | % Solids | Mass (g) | mol | eq |
|---|---|---|---|---|---|
| Example 1 | 0.5899 | 18.629 | 0.109892 | 0.00040 | 0.0041 |
| Example 2 | 3.032 | 18.51 | 0.561223 | 0.00206 | 0.0423 |
| Example 3 | 3.2082 | 18.51 | 0.593838 | 0.00218 | 0.0447 |
| Example 4 | 3.7206 | 18.51 | 0.688683 | 0.00253 | 0.0518 |

Examples 5-14

Comparative Examples

The purpose of these Examples was to evaluate commercially available PPSU polymers for their respective chlorine content and their end group content and other properties. Results for all the examples are shown in Tables 7 and 8. Tables 7 and 8 below show how the use of the monofunctional phenoxide affected the polymer's chlorine content, color stability, and molecular weight retention. Table 7 contains data for samples prepared by the Analysis 1 method. Table 8 contains data for samples prepared by the Analysis 2 method.

TABLE 7

Polymer samples as prepared by Analysis 1 (raw pellets, or polymer in examples)

| Polymer | Example | MW in kiloDaltons | PDI | Total Pol-OH | Ome total (ppm) | Cl Extract | Cl total | pol Cl |
|---|---|---|---|---|---|---|---|---|
| 0.5% PCP | 1 | 55 | — | — | — | 6632.2 | 12800 | 6168 |
| 1% PCP | 2 | 55 | — | 8 | — | 74.7 | 1300.0 | 1225 |
| 2% PCP | 3 | 52.6 | 2.43 | 1 | — | 1621.5 | 3500.0 | 1879 |
| 4% PCP | 4 | 54.9 | 2.31 | 0 | — | 7889.3 | 6800.0 | −1089 |
| BASF P3010 | 5 | 50.9 | 2.70 | 6 | 990 | 4.5 | 5050 | 5046 |
| BASF 94956367J0 | 6 | 46.9 | 2.42 | 8 | 4518 | 0 | 132 | 132 |
| BASF 86663867J0 | 7 | 48.6 | 2.42 | 6 | 4421 | 0 | 102 | 102 |
| BASF Ultrason E 2010 93419267JO | 8 | 42.9 | 2.52 | — | 1869 | 0 | 1500 | 1500 |
| Solvay Udel | 9 | 67.3 | 3.14 | 0 | 798 | 3.2 | 1700 | 1697 |
| Solvay M10297T | 10 | 50.7 | 2.47 | 9 | 944 | 0 | 3000 | 3000 |
| Solvay M10082J | 11 | 50.8 | 2.48 | 2 | 1168 | 2 | 3120 | 3118 |
| Solvay Oct. 27, 2007 | 12 | 48.3 | 2.39 | 1 | 862 | 0 | 3800 | 3800 |
| Solvay R5100NT AM667 | 13 | 50.6 | 2.44 | 0 | 1054 | 0 | 3200 | 3200 |
| Solvay R5800 | 14 | 48.2 | 2.44 | 4 | 856 | 0 | 3500 | 3500 |
| Solvay R5000 old | 15 | 50.6 | 2.43 | 2 | 826 | 0 | 3100 | 3100 |
| Solvay R5500 Black | 16 | 53.9 | 2.46 | 2 | 713 | 0 | 3200 | 3200 |
| Solvay M07187T | 17 | 47.1 | 2.50 | 9 | 963 | 1.9 | 3100 | 3098.1 |
| Jida PPSU | 18 | 45.3 | 2.43 | 72 | 0 | 310 | 3200 | 2890 |
| U2 SLT 77-79 | 19 | 42.2 | 2.77 | 92 | — | 0 | 2200 | 2200 |

TABLE 8

Polymer samples as prepared by Analysis 2 (veratrole)

| Polymer | Example | MW kDa (PS eq) | DI | Cl Extract | Cl total | pol Cl |
|---|---|---|---|---|---|---|
| 0.5% PCP | 1 | 60.8 | 2.31 | 130.0 | 3620.0 | 3490 |
| 1% PCP | 2 | 56.9 | 2.18 | 8.0 | 3050.0 | 3042 |
| 2% PCP | 3 | 55.5 | 2.08 | 30.0 | 2600.0 | 2570 |
| 4% PCP | 4 | 54.7 | 2.17 | 60.0 | 970.0 | 910 |
| BASF P3010 | 5 | 53.6 | 2.38 | 9 | 5300 | 5291 |
| Solvay M10082J | 11 | 55.3 | 2.15 | 0 | 3100.0 | 3100 |
| Solvay Oct. 27, 2007 | 12 | 52.5 | 2.10 | 2 | 3400 | 3398 |
| Solvay R5100NT AM667 | 13 | 54.7 | 2.08 | 3 | 2780 | 2777 |
| Solvay R5800 | 14 | 52.6 | 2.14 | 4 | 3200 | 3196 |
| Solvay R5000 old | 15 | 54.0 | 2.18 | 10 | 2440 | 2430 |
| Solvay R5500 Black | 16 | 53.9 | 2.46 | 0 | 3060.0 | 3060 |
| Solvay M07187T | 17 | 54.8 | 2.07 | 0 | 3180.0 | 3180 |
| Jida PPSU | 18 | 52.1 | 2.17 | 13.0 | 2920.0 | 2907 |
| U2 SLT 77-79 | 19 | 45.7 | 2.46 | 13 | 2070 | 2057 |

Figure 2:
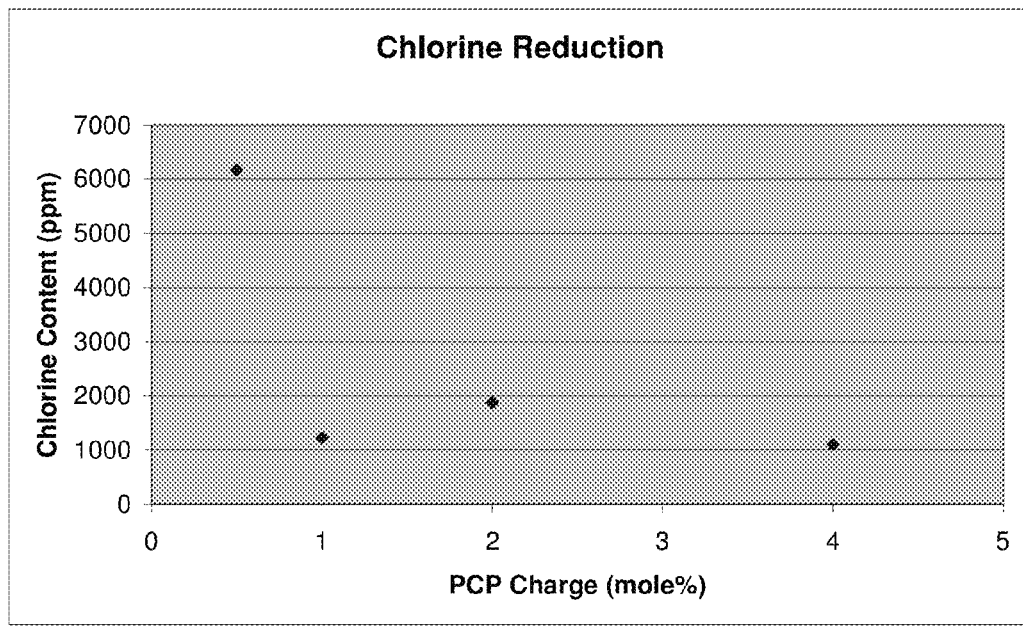

The results show that the use of the monofunctional phenoxide unexpectedly produced a polymer having surprising combination of low chlorine content, low hydroxyl end group content and that materials made in the inventive examples were methoxy-free, which means that it was possible to make a poly(aryl ether sulfone) without reactive alkyl halide-containing materials. As such, advantageously, the poly(aryl ether sulfone) units of formula (I) are methoxy free, which means, in part, that methyl chloride does not have to be used. The results, as shown in FIG. 1, also show that use of a monofunctional phenoxide is useful in controlling the molecular weight of the poly(aryl ether sulfone). More particularly, FIG. 1 shows the relationship between the amount of para-cumyl phenol and the weight average molecular weight of the poly(aryl ether sulfone). Additionally, FIG. 2 demonstrates that that the para-cumyl phenol reduces the amount of chlorine in the polymer.

Based on these results, (that our poly(aryl ether sulfone had relatively low hydroxyl groups (an OH content that is more than 0 and less than 50 ppm) we can also infer that the polymer has a yellowness index that is less than 120 after an article made from the polymer is exposed to a temperature that is 200° C. in ambient air for 28 days; and the polymer has a thermal stability factor greater than or equal to 90%.

Example 20

The purpose of this Example was to determine whether our methoxy free poly(aryl ether sulfone) could be made without Bisphenol-A salt. Laboratory polymerizations were performed by the following procedure. In a nitrogen atmosphere, a 3-neck 250 milliliter flask was charged with solid 4,4'- dichlorodiphenyl sulfone, 5 wt % suspension of p-cumyl phenol sodium salt in o-dichlorobenzene, a suspension of 4,4'-biphenol disodium salt in o-dichlorobenzene, solid $K_2CO_3$ and dry o-dichlorobenzene. All suspensions were individually measured for phenoxide content by potentiometric titration with 0.1N HCl in 50% (v/v) MeOH/$H_2O$. Additionally attached to the flask was a modified thermometer adapter with septa, a glass rod with Teflon blade, and a Dean Stark trap with Teflon stopper. Nitrogen was supplied to the flask by a stainless steel needle through the septum and the stopper replaced by a water-cooled condenser when placed in a fume hood. Heat was supplied by a temperature controlled oil bath at 200° C. and the contents were azeotropically dried by removal of o-dichlorobenzene until collected overheads were below 20 ppm $H_2O$ by Karl Fischer titration and the desired reaction solids, typically 25-28% polymer, were reached. A 20 wt % solution of catalyst (hexaethylguanadinium chloride) in o-dichlorobenzene, typically 4 mol % with respect to dichlorodiphenyl sulfone, was slowly added to the flask by syringe through the septum. Additional catalyst was added if the reaction did not initiate. Upon reaction initiation, an exotherm and a color change were observed and molecular weight built immediately.

Results

| | | 0.5 mol % PCP | | | |
|---|---|---|---|---|---|
| | Charge (g) | % Solids | Mass (g) | mol | eq |
| Example 20 | DCDPS | 28.00 | | 28.00 | 0.09751 | 1.0000 |
| | BP Salt | 110.44 | 19.862 | 21.94 | 0.0953 | 0.9777 |
| | BPA Salt | 0 | na | 0 | 0 | 0 |
| | PCP Salt | 2.28 | 5 | 0.114 | 0.00049 | 0.0050 |
| | K2CO3 | 2 | | 2 | 0.01447 | 0.1484 |
| | HEGCl | 5.16 | 20 | 1.032 | 0.00391 | 0.0401 |
| | ODCB | 99.758 | | | | |

Our results show that Bisphenol-A salt does not need to be present to methoxy free poly(aryl ether sulfone).

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All patents and published articles cited herein are incorporated herein by reference.

The invention claimed is:

1. A method for preparing the poly(aryl ether sulfone), comprising
    reacting at least one bishydroxy aromatic compound with an aqueous mixture of alkali metal hydroxide, thereby forming bis salt of the bishydroxy aromatic compound;
    drying the bis salt of the bishydroxy aromatic compound, thereby forming a dry bis salt of the bishydroxy aromatic compound;
    reacting the dry bis salt of the bishydroxy aromatic compound with at least one dihalodiaryl sulfone in the presence of an organic solvent, an alkali metal carbonate, and a phase transfer catalyst at a temperature of 125-185° C. thereby forming the poly(aryl ether sulfone) wherein the organic solvent comprises ortho-dichlorobenzene, para-dichlorobenzene, dichlorotoluene, 1,2,4-trichlorobenzene, phenetole, anisole, veratrole, and mixtures thereof;
    wherein a monofunctional phenoxide is added during the method in a sufficient amount to result in a poly(aryl ether sulfone) having a halogen content less than 3000 parts per million, based on the poly(aryl ether sulfone) weight.

2. The method of claim 1, wherein the monofunctional phenoxide is added in situ when the at least one bishydroxy aromatic compound reacts with the aqueous mixture of alkali metal hydroxide, prior to the formation of the bis salt of the bishydroxy aromatic compound.

3. The method of claim 1, wherein the bis salt of the bishydroxy aromatic compound is dried before the phase transfer catalyst is added.

4. The method of claim 1, wherein the monofunctional phenoxide is added after the poly(aryl ether sulfone) forms.

5. The method of claim 1, wherein the wherein the monofunctional phenoxide is selected from the group consisting of phenol, p-t-butyl-phenol, m-t-butyl-phenol, 4-hydroxybenzamide, 4-phenoxyphenol, 4-hydroxy-N,N-dimethylbenzamide, 4-ethynylphenol, 4-tert-butyl-2-methylphenol, 4-(2-phenylpropan-2-yl)phenol, (4-hydroxyphenyl)(phenyl)methanone, methyl 4-hydroxybenzoate, 4-(2,4-dimethylheptan-3-yl)phenol, para cumyl phenol, 4-phenyl phenol, para methyl phenol, para nonylphenols, o-t-butyl phenol, hydroxy benzoic acid esters, and combinations thereof.

6. The method of claim 1, wherein the monofunctional phenoxide is selected from the group consisting of phenol, para cumyl phenol, 4-phenyl phenol, and combinations thereof.

7. The method of claim 1, wherein the dry bis salt of the bishydroxy aromatic compound reacts with at least one dihalodiaryl sulfone in the presence of an organic solvent under conditions where the solvent-polymer mixture has a % solids is greater than 0 and less than 25 weight %, based on the total weight of the polymer and solvent mixture, and the reaction occurs at a temperature of 170 to 185° C.

8. The method of claim 1, wherein the poly(aryl ether sulfone) comprises units of formula (I):

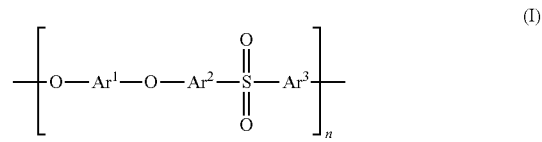

wherein $Ar^1$ is a divalent $C_6$-$C_{15}$ aromatic group, $Ar^2$ is a divalent $C_6$-$C_{15}$ aromatic group, $Ar^3$ is a divalent $C_6$-$C_{15}$ aromatic group, and n is greater than 1;

and a terminal group of formula (II) derived from a monofunctional phenoxide

wherein X is a hydrogen atom or an organic substituent having from 1 to 20 carbon atoms and wherein the polymer is methoxy free and the polymer has an OH content greater than 0 and less than 50 ppm, based on polymer weight, a glass transition temperature of 180 to 290° C., a molecular weight of 20,000 to 100,000, and a halogen content of more than 0 and less than 3000 ppm.

* * * * *